April 4, 1961     O. H. BANKER     2,977,813
POWER STEERING MECHANISM
Filed April 13, 1955     5 Sheets-Sheet 1

INVENTOR.
Oscar H. Banker
BY
Charles P. Vrtech
Attorney

April 4, 1961
O. H. BANKER
2,977,813
POWER STEERING MECHANISM
Filed April 13, 1955
5 Sheets-Sheet 2
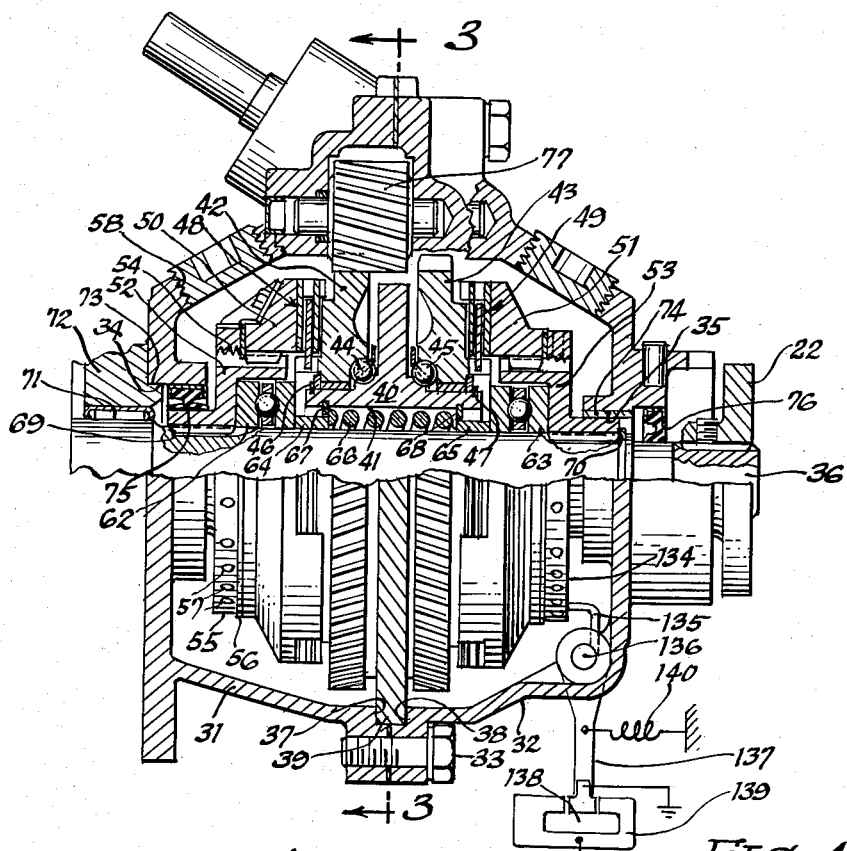
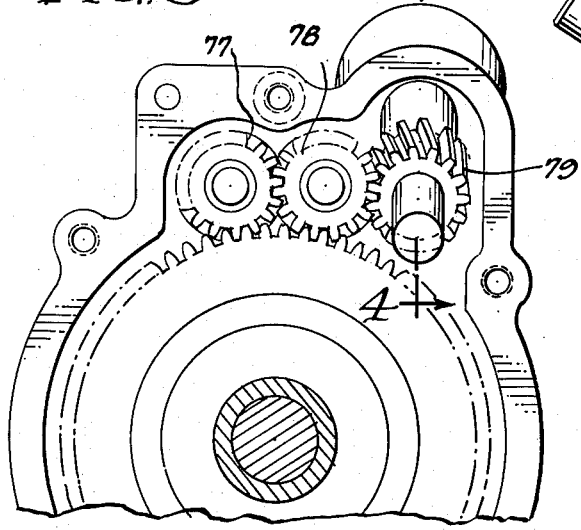
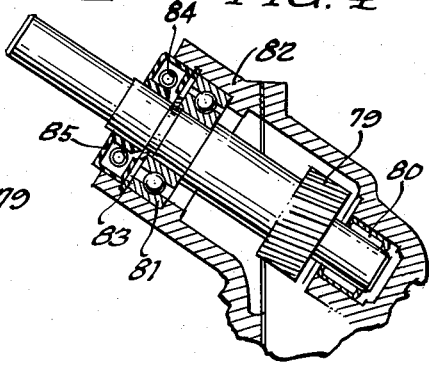
INVENTOR.
Oscar H. Banker
BY
Charles P. Vrytech
Attorney April 4, 1961 — O. H. BANKER — 2,977,813
POWER STEERING MECHANISM
Filed April 13, 1955 — 5 Sheets-Sheet 3

INVENTOR.
Oscar H. Banker
BY
Charles F. Vajtech
Attorney

April 4, 1961     O. H. BANKER     2,977,813
POWER STEERING MECHANISM
Filed April 13, 1955     5 Sheets-Sheet 4

INVENTOR.
Oscar H. Banker
BY Charles J. Vojtech
Attorney

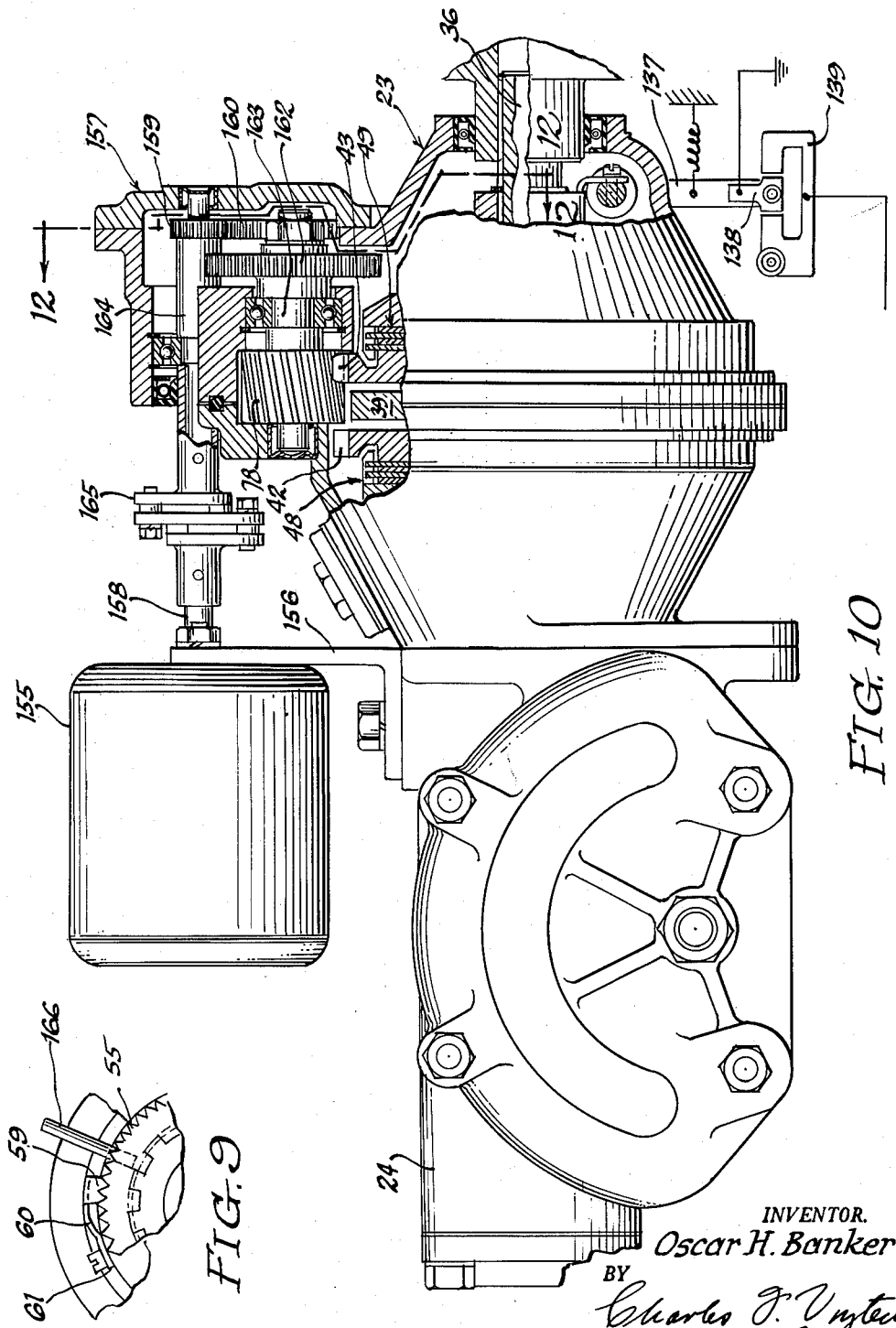

United States Patent Office 2,977,813
Patented Apr. 4, 1961

2,977,813

POWER STEERING MECHANISM

Oscar H. Banker, Evanston, Ill., assignor, by mesne assignments, to Fawick Corporation, Cleveland, Ohio, a corporation of Michigan Filed Apr. 13, 1955, Ser. No. 501,017

12 Claims. (Cl. 74—388)

This invention relates to power steering mechanisms for automotive vehicles. It is particularly adapted for use with passenger automobiles but it is not limited to such use and can be adapted to any steering mechanism, the functioning of which at times may require the expenditure of relatively large amounts of human energy.

Power steering mechanisms as presently commercially designed generally rely on fluid under pressure for the additional energy required to augment the energy of the driver in manipulating the steering wheel of the vehicle. Such fluid pressure energy may take the form of a pneumatic motor utilizing either the engine vacuum, or differential air pressure developed by a pump or the like, or it may take the form of a hydraulic piston deriving its energy from oil under pressure developed either by a separate pump or by a lubrication system of the automobile engine.

Since the energy required to turn the wheels of a vehicle may be considerable, particularly when the vehicle is standing still, or moving at extremely slow speeds, the size of the fluid motor used in the aforementioned systems must similarly be relatively large. The number of accessories presently associated with a vehicle engine and located under the engine hood is already large and is steadily growing. Accordingly, the amount of space available for power steering mechanisms is extremely limited and cannot readily be enlarged since the power steering mechanism must be necessarily be located at the steering column, and the steering column, in turn, must necessarily pass through the front of the vehicle where the engine is located. The fluid pressure power type of steering mechanism therefore possesses serious disadvantages.

One of the objects of this invention is the provision of a power steering mechanism for automotive vehicles or the like which does not use fluid under pressure as the source of auxiliary energy required to assist the operator in steering the vehicle.

Another object of this invention is the provision of a power steering mechanism which uses oppositely rotating gears energized by a common means, with clutch means for connecting one or the other of the gears to the steering mechanism, the clutch means in turn being automatically selected as a function of the manual operation of the steering mechanism.

As a more specific object, this invention seeks the provision of a power steering mechanism which in one form derives its energy from the fan belt of the engine associated with the vehicle, with fluid operated clutch means adapted to engage and disengage the fan belt as a power source from the power steering mechanism, and with means automatically operable as an incident to the operation of the steering mechanism by the vehicle driver for controlling the fluid operated clutch.

As a still more specific object, this invention seeks to provide a control for a power steering mechanism used to assist in the manual operation of a steering mechanism, wherein the initial movement of the manually operated portion of the steering mechanism necessary to take up play in the mechanism is utilized to operate a switch, which, in turn, controls the application of power to the power steering mechanism. The same movement which results in the application of power to the mechanism also is utilized to select the direction of rotation to be imparted by the power mechanism to the steering system.

It is also among the more general objects of this invention to provide a power steering mechanism to be used to assist a manually operated steering system wherein said power steering mechanism is compact and adapted to fit readily on existing systems, is thoroughly reliable in its operation, does not interfere with the manual operation of the steering mechanism in the event of a power failure resulting from an inoperative engine or a dead battery, is silent in its operation, and which may be made and assembled by any manufacturer familiar with the production of gear type power transmitting devices.

A feature of this invention is the provision of a torque release mechanism in the power source which disconnects the power source from the steering mechanism to avoid serious damage to the mechanism and wheels in the event the wheels are cramped against the curb or other obstruction while the driver seeks to turn the wheels toward such obstruction, the torque release mechanism also emitting an audible signal to apprise the operator of the existence of this condition.

These and other objects and features of this invention will become apparent from the following detailed description when taken together with the accompanying drawings in which:

Fig. 2 is a greatly enlarged elevation in section of the direction selecting mechanism of the power steering mechanism shown in Fig. 1;

Fig. 3 is an end elevation in section of the mechanism of Fig. 2 looking in the direction of arrows 3—3 thereof;

Fig. 4 is a side elevation in section of the drive gear of the power steering mechanism and of a portion of the drive gear shaft, the section being taken along the line and in the direction of the arrows 4—4 of Fig. 3;

Fig. 9 is a fragmentary end elevation of an anti-rattle and locking device used in the mechanisms of Figs. 2 and 10;

Fig. 10 is an enlarged elevational view in section of a modification of the mechanism of Fig. 1, the modification utilizing an electric motor in place of the engine fan belt as a source of power;

Figure 1:
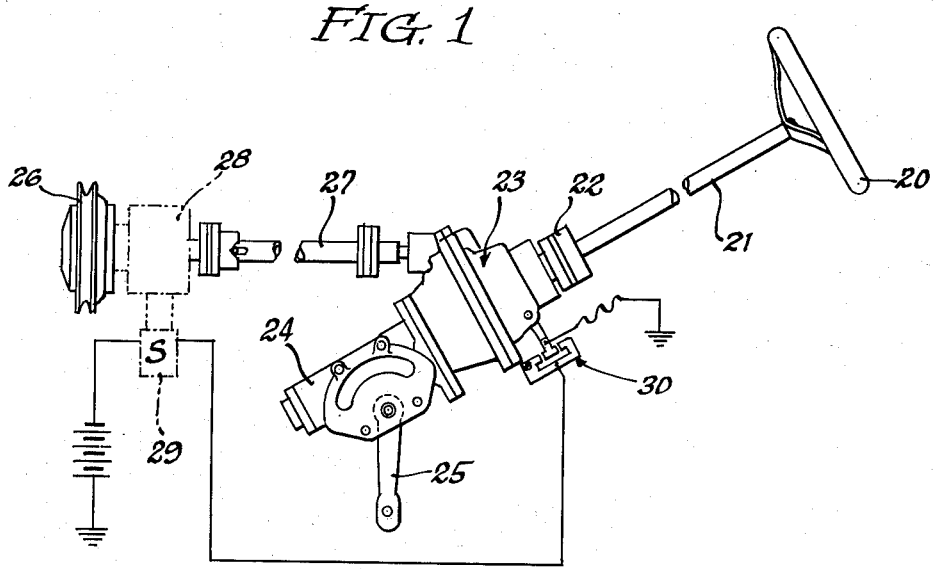
Fig. 1 is a side elevational view of a typical automotive vehicle steering mechanism showing the power steering mechanism of this invention applied thereto.

Referring now to Fig. 1 for a general description of the invention, there is shown a steering wheel 20, such as is commonly found in automotive vehicles, secured to a steering column 21 and connected by a coupling 22 of suitable design to the direction selecting mechanism 23 of the power steering device of this invention. Said direction selecting mechanism is, in turn, connected to the steering worm 24 of conventional design which operates the steering link 25. The end of link 25 may be connected in any suitable manner to the remaining steering linkage associated with the front wheels of the vehicle.

The power for mechanism 23 is derived from a pulley 26 designed to be driven by the fan belt of the vehicle engine (not shown) and selectively connected by a clutch, hereinafter to be described, to a shaft 27 which transmits the power from the pulley to the direction selecting mechanism 23. The clutch in turn is operated by the hydraulic mechanism 28 controlled by a solenoid 29. Said solenoid 29 is controlled by a switch 30 which is operated as an incident to the operation of the direction selecting mechanism.

The details of construction of the direction selecting mechanism 23 is shown in Fig. 2. It is comprised of a bipartite housing having a left section 31 and a right section 32, as viewed in Fig. 2, joined together by bolts 33. Said sections 31 and 32 are formed with central openings 34 and 35, respectively, through which passes a shaft 36 adapted at its right hand end as viewed in Fig. 2 to be directly connected to coupling 22 for rotation therewith. Each section 31 and 32 has provided, in the portion thereof adjoining the other, recesses 37 and 38 in which is received a plate 39 which is positioned by the recesses and clamped therein by the bolts 33. Plate 39 forms a partition and a reaction member for the direction selecting mechanism and also has other functions hereinafter to be described.

Plate 39 has a sleeve 40 formed integrally therewith, the inner surface 41 thereof being disposed concentrically with respect to shaft 36 and spaced therefrom. A pair of gears 42, 43 are mounted for free rotation on sleeve 40 on opposite sides of plate 39, each gear being provided with an antifriction bearing 44, 45, respectively, designed to take both radial and axial thrust. Said gears are retained on sleeve 40 by snap rings 46 and 47. Each gear 42 and 43 forms both the reaction member and the drive member of a multiple plate friction clutch 48 and 49, respectively, the driven member 50 and 51 of each clutch being splined to hub members 52 and 53, each of which is in turn splined to shaft 36 so as to be rotatable therewith.

Hub member 52 has external threads 54 formed on the ends of the splines thereof on which is mounted a threaded ring 55, the function of which is to provide an adjustable abutment for clutch driven member 50. A lock washer 56 is interposed between ring 55 and clutch driven member 50. A plurality of radially disposed openings 57 is formed on the exterior of ring 55 for the reception of a suitable pin 166 (Fig. 9) by which ring 55 may be turned to effect the aforementioned adjustment. An access opening 58 is provided in housing 31 in proximity to ring 55 through which pin 166 may be inserted and manipulated.

As shown more clearly in Fig. 9, the exterior surface of ring 55 has a plurality of axially extending V-grooves formed therein into which a pawl 59 may be pressed by a leaf spring 60 having its free end 61 secured to member 50. Pawl 59 serves to lock ring 55 in any selected position thereof and also serves as an anti-rattle device for member 50.

Within each hub member 52 and 53 is disposed an anti-friction bearing 62, 63, respectively, which abuts on its respective hub member and is designed to take axial thrust therefrom. Adjacent each bearing 62, 63 is a thrust ring 64, 65, respectively, the inner ends of which are adapted to contact the ends of a helical spring 66 disposed within sleeve 40 in the space between the sleeve and shaft 36. Spring 66 is placed under initial compression by a pair of spaced snap rings 67, 68, mounted in suitable grooves formed on the interior of sleeve 40.

It is understood that the construction of clutches 48 and 49 is substantially identical, as is also the construction of the adjusting means for the driven members 50 and 51 thereof relative to their respective hub members 52 and 53. A detailed description of these parts of clutch 49 therefore will be omitted.

Hub member 52 abuts on its left-hand side, as viewed in Fig. 2, against a shoulder 69 on shaft 36, and hub member 53 abuts at its right-hand side, as viewed in Fig. 2, against a snap ring 70 disposed in a peripheral groove in shaft 36. Said shaft 36 is supported by a needle bearing 71 for relative axial movement in housing 72 for the steering worm 24, and housing 31 is centered relative to shaft 36 and housing 72 by a shoulder 73 formed on housing 72 and adapted to be received within opening 34 in housing 31. Hub member 53 is supported from housing 31 by a sleeve bearing 74, and suitable seals 75 and 76 are provided for the retention of lubricant in housing 31.

It may be apparent from the description thus far given that should shaft 36 be moved axially to the right as viewed in Fig. 2, hub member 52 will be likewise moved to the right and will carry with it clutch driven member 50 because of the abutment therefor provided by ring 55 and washer 56. Since gear 42 is axially stationary, movement of clutch driven member 50 to the right will cause an engagement of clutch 48, resulting in the rotation of clutch driven member 50, hub member 52 and shaft 36 with it. Simultaneously with the movement of hub member 52 to the right as viewed in Fig. 2, bearing 62 and thrust ring 64 will be moved to the right against the action of spring 66. This not only provides a force in the direction of engaging clutch 48, but also insures the release of clutch 49 which, if engaged, would tend to cause a simultaneous rotation of shaft 36 in opposite directions with the resultant destruction of both clutches. Thus, as long as shaft 36 occupies a position disposed to the right of the one depicted in Fig. 2, clutch 48 will be engaged and the rotation of gear 42 will be imparted to shaft 36.

In a similar manner, movement of shaft 36 to the left, as viewed in Fig. 2, causes a leftward movement of hub member 53 and clutch driven member 51 to result in the engagement of clutch 49 and the corresponding rotation of driven member 51, hub member 53 and shaft 36 with, and in the same direction as, gear 43. In the absence of any axial force on shaft 36 in either direction, spring 66 will urge both hub members 53 away from plate 39, thereby relieving clutch driven members 50 and 51 of any pressure in an engaging direction, and said clutch driven members will therefore float without transmitting an appreciable drive to shaft 36.

It is contemplated that the axial force necessary to shift shaft 36 either to the right or to the left as viewed in Fig. 2 will be derived from the lost motion, or normal clearances, in the worm 24 taken up when shaft 36 is rotated by steering wheel 20 and steering column 21 in the normal manual steering operation of the vehicle.

Referring now to Fig. 3, gear 42 is constantly in mesh with a drive pinion 77 which in turn is constantly in mesh with a similar drive pinion 78, the latter being in mesh with gear 43. Gear 78 is constantly in mesh with a drive pinion 79 mounted at an angle in housing 31 and driven by shaft 27. This arrangement causes gears 77 and 78 to rotate in opposite directions, the rotation being transmitted directly to gears 42 and 43, and both gears 77 and 78 being driven whenever pinion 79 is rotated. As shown in Fig. 4, pinion 79 is supported in a needle bearing 80 in housing 31, and in a ball bearing 81 fixed in an angularly disposed hollow boss 82 in the left-hand half (Fig. 2) of housing 31. Snap rings 83 and 84 serve to retain bearing 81 in housing 82 and the extension of shaft 27 in housing 31. The entire assembly is sealed against ingress of dirt, water, etc., and egress of lubricant by a lip type seal 85.

Figure 6:
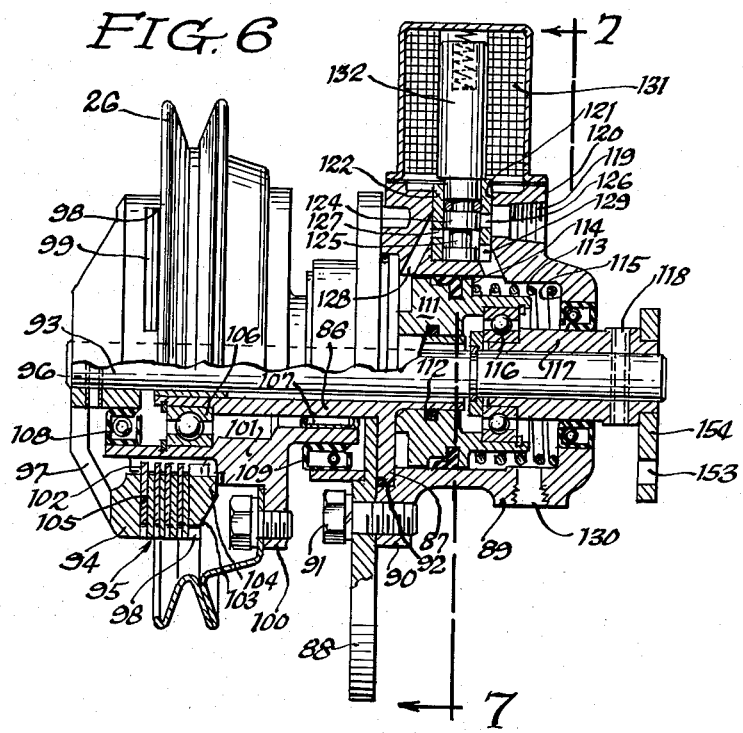
Fig. 6 is an enlarged elevation, partly in section, of the means for controlling the application of power to the mechanism.
Figure 7:
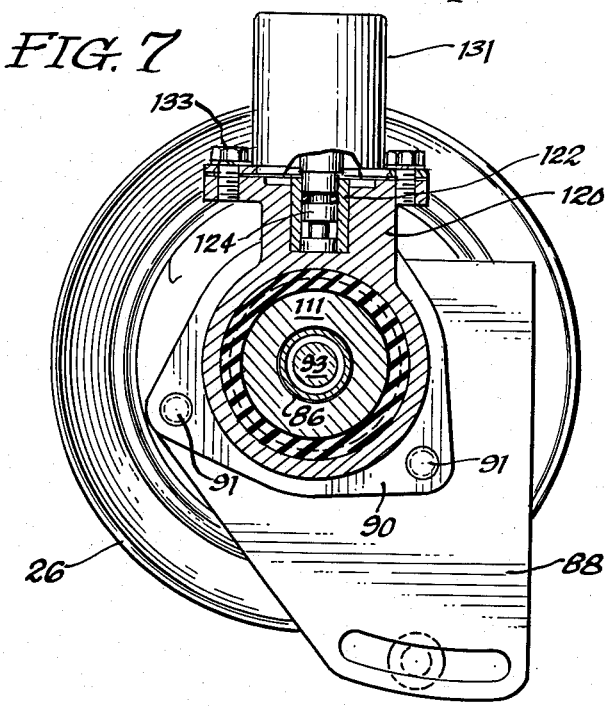
Fig. 7 is an end elevation in section of the control means of Fig. 6, the section being taken along line 7—7 of Fig. 6 and looking in the direction of the arrows at the end thereof.

Passing next to Figs. 6 and 7, the power for driving shaft 27 and its associated gear 79 is derived from pulley 26 which is rotatably mounted on a sleeve 86 having a radially extending flange 87 near one end thereof by which the sleeve may be clamped to a bracket 88. The clamping means comprises a cylinder 89 having a flange 90 adapted to be secured to bracket 88 by a plurality of bolts 91. The outer periphery of flange 87 is received in a recess 92 of slightly less depth than the thickness of flange 87 so as to result in the desired clamping action of flange 87 against bracket 88 when bolts 91 are tightened.

Within sleeve 86 is mounted a shaft 93 to the left hand end of which, as viewed in Fig. 7, is fastened a belled driven housing 94 of a multiple plate dry friction clutch 95. The means for fixing housing 94 to shaft 93 may be a screw 96 of the Allen head type, access to which from the exterior of housing 94 may be had through a slot 97 formed in housing 94. Belled housing has a plurality of notches 98 formed in the exterior surface thereof through which the driving ears 99 of the driven clutch plates may extend and by which the housing is driven from the clutch plates.

Pulley 26 is bolted to the flange 100 of the clutch driving hub 101 to which are splined the driving clutch plates 102. A reaction plate 103 of rigid form is provided for clutch 95, said reaction plate abutting on a shoulder 104 formed in clutch driving hub 101. A rigid clutch pressure plate 105 is formed on the interior of belled driven housing 94, preferably as an integral part thereof, and the driving and driven clutch plates are accordingly compressed between pressure plate 105 and reaction plate 103 when clutch 95 is engaged.

Hub 101 is supported from sleeve 86 by a ball bearing 106 at one end of the hub, and by a needle bearing 107 at the other end. A seal 108, inserted between hub 101 and belled driven housing 94, serves to prevent dust from entering between sleeve 86 and hub 101 and also prevents lubricant from escaping from the bearing and entering between the plates of clutch 95. A similar seal 109 performs the same functions at the other end of clutch driving hub 101, said seal being retained between the hub and a cylindrical extension 110 on bracket 88.

It may be observed from the description thus far given that clutch 95 may be engaged and disengaged by an appropriate axial movement of shaft 93. The means by which such movement is imparted to the shaft will now be described.

Within cylinder 89 is disposed an annular piston 111 which surrounds an extension 112 of sleeve 86. Piston 111 is continuously urged to the left, as viewed in Fig. 6, by a spring 113 compressed between a shoulder 114 on piston 111 and radially inwardly extending flange 115 on housing 89. Said piston 111 is connected by a ball bearing 116 to a sleeve 117 secured for rotation with shaft 93 by a pin 118. Ball bearing 116 is rigidly held against axial movement relative to piston 111 and sleeve 117 by appropriate shoulders formed in each of these members and by suitable removable snap rings constructed in a manner obvious to those skilled in the art. The rigid axial connection between piston 111 and sleeve 117 results in an axial movement of shaft 93 whenever piston 111 is moved axially. Piston 111 is sealed with respect to extension 112 and cylinder 89 by means likewise familiar to those skilled in the art.

Fluid for operating piston 111 may be derived from any suitable source, but I prefer to take advantage of the engine lubricating system which utilizes oil under pressure. Said pressurized oil is conducted from the lubricating system to an inlet opening 119 formed in a relatively large radially extending boss 120 preferably formed integrally with cylinder 89. Said opening 119 is intercepted by a vertical bore 121 (Fig. 6) into which is pressed a valve sleeve 122. Within valve sleeve 122 is axially reciprocable a cylindrical valve 124 having a peripheral groove 125 formed therein.

Valve sleeve 122 has an inlet port 126 in communication with inlet opening 119, an outlet port 127 in communication with a passageway 128 leading to the left-hand side of piston 111 (Fig. 6), a vent port 129 communicating with the interior of cylinder 89 disposed to the right of piston 111, and a return opening 130 connected with the crankcase of the engine.

It may be observed at this point that oil entering cylinder 89 from vent port 129 serves to lubricate bearing 116 and may then pass between shaft 93 and sleeve 86 to lubricate the bearing bushings therebetween and then pass outwardly between sleeve 86 and clutch driving hub 101 to lubricate bearings 106 and 107.

Valve 124 is reciprocated in valve sleeve 122 by the armature 132 of a solenoid 131 to which valve 124 may be rigidly secured. Solenoid 131 may be secured to boss 120 by suitable bolts 133 disposed in appropriate ears formed on the housing for the solenoid and also on boss 120, as shown more clearly in Fig. 7.

The operation of solenoid 131 is controlled by the movement of hub member 53. As shown in Fig. 2, hub member 53 is provided with a radially disposed surface 134 which is adapted to be contacted by a curved finger 135 secured to a rock shaft 136 passing through housing section 32 and connected at its outer end to a switch arm 137. A contact 138 secured to the free end of switch arm 137 is disposed between U-shaped contacts 139 which are suitably rigidly mounted on a frame fixed relative to housing section 32. A spring 140 constantly biases switch arm 137 in a counter-clockwise direction as viewed in Fig. 2, thereby causing finger 135 continually to bear against surface 134.

The end 138 of switch arm 137 is of course narrower than the spacing between the contact 139 and is so disposed relative thereto that when hub member 53 occupies the position shown in Fig. 2, that is, when neither clutch 48 nor clutch 49 is driving, no contact will be established between the contact 138 and the contacts 139. Upon an axial movement of hub member 53 in either direction, contact will be established between contacts 138 and 139 to complete an electrical circuit therethrough.

Figure 8:
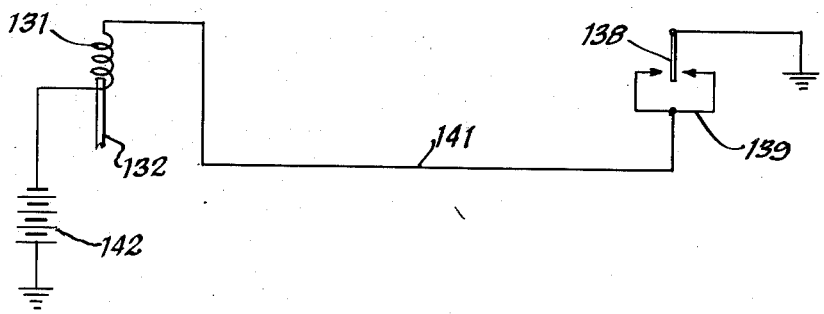
Fig. 8 is a schematic wiring diagram for the mechanism.

The electrical circuit including contacts 138, 139 and solenoid 131 is shown in Fig. 8, from which it may be seen that contact 138 on the switch arm 137 may be connected to ground and contacts 139 may be connected by a wire 141 to solenoid 131, which, in turn, is connected to a battery 142 or other suitable source of electrical energy having its other terminal connected to ground. Thus, whenever electrical contact is established between contact 138 of switch arm 137 and contacts 139, solenoid 131 is energized, whereupon its armature 132 is pulled up and valve 124 is similarly moved upwardly in valve sleeve 122 as viewed in Fig. 6. This causes peripheral groove 125 to bridge ports 126 and 127, thereby admitting fluid under pressure to the left-hand side of piston 111 as viewed in Fig. 6. This fluid pressure causes piston 111 and its associated sleeve 117 and shaft 93 to move to the right, as viewed in Fig. 6, to compress the plates of clutch 95 and results in a drive being established from pulley 26 to shaft 93. Breaking of the electrical contact between contacts 138 and 139 causes solenoid 131 to be deenergized, and armature 132 will then move downwardly under the action of the spring usually provided in the solenoid for this purpose to cause valve 124 to assume the position shown in Fig. 6, wherein groove 125 connects port 127 to vent port 129, relieving the pressure behind piston 111 and permitting spring 113 to return piston 111 to the position shown in Fig. 6. The return movement of the piston will force the oil out of cylinder 89 ahead of piston 111 and out through vent port 129 into the space behind piston 111 to lubricate the moving parts of this portion of the mechanism as aforesaid.

Figure 5:
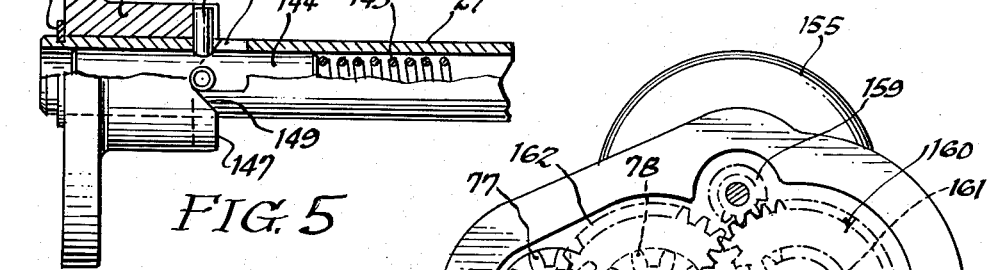
Fig. 5 is a greatly enlarged elevation, partly in section, of the torque releasing mechanism.

The drive from shaft 93 is transmitted to shaft 27 by the mechanism shown in Fig. 5. Said shaft 27 may be hollow in part and contain a spring 143 continuously pushing to the left (Fig. 5) against a plunger 144 disposed in shaft 27 and provided with radially outwardly extending rollers 145. Said rollers extend through appropriate slots 146 formed in shaft 27, and are adapted to contact the end 147 of a coupling hub 148. Said end 147 is formed with V-shaped grooves 149, one for each roller 145 so that the axial thrust of the plunger and rollers 145 is transmitted to hub 148 through said grooves 149. A snap ring 150 on shaft 27 limits the axial movement of hub 148 thereon to the left as viewed in Fig. 5. Hub 148 is provided with a flange 151 extending radially outwardly therefrom and having an opening 152 therein which matches an opening 153 (Fig. 6) in a coupling plate 154 secured by welding or otherwise for rotation with sleeve 117. A suitable bolt (not shown) may be passed through openings 152 and 153 to connect the two parts of the coupling for rotation together.

Except for rollers 145, hub 148 is free to rotate relative to shaft 27, and hence rotation imparted to shaft 93 and thence to hub 148 through the aforementioned coupling connection is transmitted to shaft 27 through the grooves 149 and rollers 145. As long as the torque transmitted through the rollers does not produce an axial component of force greater than the force exerted upon rollers 145 in the opposite axial direction by spring 143, the drive will be transmitted from coupling hub 148 to shaft 27 to rotate the latter. When such axial component of force does exceed that produced by spring 143, rollers 145 will be cammed out of their grooves 149, will ride around on end 147 to the next groove 149 into which they will then drop with a snap, only to be cammed out again, the cycle continuing and producing a rapid vibration of plunger 144 which results in an audible signal, indicating to the operator that he is attempting to move the wheels against an immovable obstruction and that he should immediately turn his steering wheel in the opposite direction.

Figure 11:
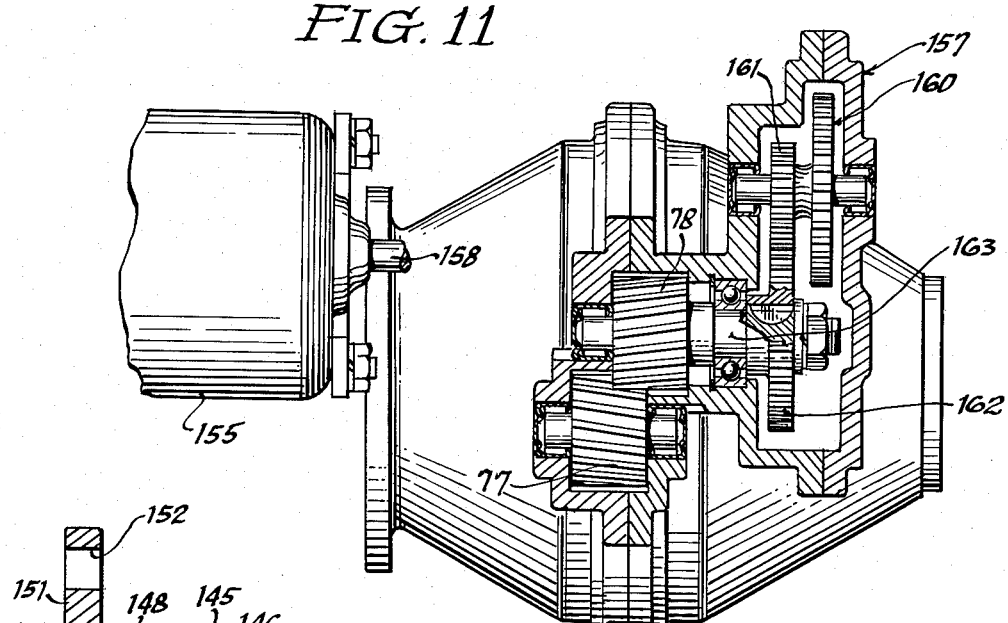
Fig. 11 is a plan view, partly in section, of the mechanism of Fig. 10.
Figure 12:
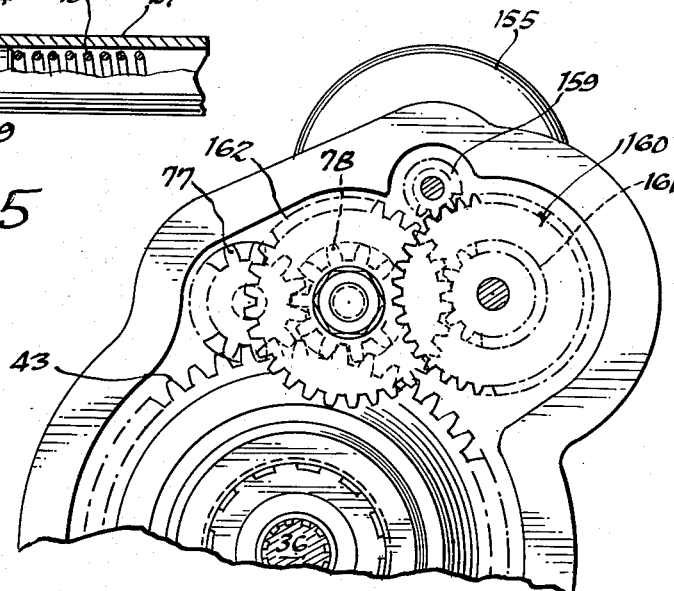
Fig. 12 is an end elevation of the mechanism of Fig. 10 with the end cover removed.

The modification shown in Figs. 10, 11 and 12 is substantially the same as the one just described except that the power for operating the mechanism is obtained from an electric motor 155 supported on a bracket 156 mounted on the steering wheel housing 24 instead of from the engine fan belt. The Fig. 10 form is therefore substantially self-contained and also requires less space. The direction selecting mechanism 23 may be provided with the same gears 42 and 43 for driving clutches 48 and 49, respectively, the said gears being mounted on a reaction plate 39 just as in the Fig. 2 form.

Due to the relatively high speed of motor 155 as compared to the speed of pulley 26 of Fig. 6, a speed reduction mechanism 157 is interposed between the shaft 158 of motor 155 and the gears 77 and 78 which drive gears 42 and 43, respectively. The reduction mechanism, as shown more clearly in Fig. 12, is comprised of a pinion gear 159 driven directly from motor shaft 158 and driving a gear cluster 160, the small pinion 161 (Fig. 11) of which drives a large gear 162 keyed to shaft 163 to which gear 78 is affixed. The sizes of the gears in the speed reducer 157 are so chosen as to provide the appropriate speed ratio between motor shaft 158 and gear 78.

Gear 159 may be formed integrally with a shaft 164 which is pinned to a flexible coupling 165 driven from motor shaft 158. If desired, the torque release mechanism of Fig. 5 may be interposed between coupling 165 and shaft 164.

The control for motor 155 may be substantially identical with the control for solenoid 131 so that as switch arm 137 is oscillated to establish electrical contact between contacts 138 and 139, motor 155 is energized or deenergized as the case may be. It is contemplated that switch lever 137 will be very sensitive to axial movements of shaft 36 so that contact is established between contacts 138 and 139 prior to the completion of the axial movement of said shaft 36 to engage either clutch 48 or 49. This sensitivity insures bringing motor 155 up to speed before clutch 48 or 49 is engaged so that power to assist in the steering operation is available at the instant it is required.

Alternatively, motor 155 may be connected in series with the ignition switch (not shown) so that said motor 155 is operated continuously as long as the ignition switch is on, which, under normal conditions, would be whenever the engine is running.

It may be observed that clutches 48 and 49 are to some extent self-energizing in the sense that once applied, or engaged, the increased torque on shaft 36 resulting from the application of power from the engine or motor causes an increased reaction from the worm wheel operated by the steering gear worm, the increased reaction being in the direction of the initial engaging pressure. It may be observed further that when shaft 36 has no torque load impressed upon it, either directly by the driver, or indirectly by the reaction from the steering gear worm, the spring 66 will exert an equal disengaging force on both clutches 48 and 49 and will hold said clutches in disengaged condition. Should there be a power failure in the example shown in Figs. 2 to 6, the vehicle may still be steered manually with only a slight increase in the force required to do this, the increase resulting from the fact that gears 77, 78 and 79 and their associated shafts with their attendant inertia forces will be rotated along with shaft 36. If, however, under power failure conditions the steering force is very light, so that the endwise reaction in shaft 36 is correspondingly very slight, the clutch 48, or 49, which would normally be engaged will slip, thereby making it unnecessary to rotate gears 77, 78 and 79 and their associated shaft mechanisms, and reducing the amount of force required to effect a steering operation.

In the Fig. 10 form, under power failure conditions greater effort must be applied to the steering wheel to effect a turn inasmuch as the inertia of the armature of motor 155 will be added to that of gears 77, 78 and of the speed reducer 157.

The pulley driven clutch 95 and the control therefor of Fig. 6 constitute a convenient power unit. It may, if occasion demands, be used to drive other accessories of a motor vehicle when appropriate controls and additional power takeoff connections are provided for the solenoid 131 and shaft 93, respectively.

It is understood that the foregoing description is merely illustrative of preferred embodiments of the invention and that the scope of the invention therefore is not to be limited thereto but is to be determined by the appended claims.

I claim:

1. A worm drive including a manually rotatable shaft and a worm secured thereto and rotated thereby, and an auxiliary power applying device for the said shaft, said shaft having limited axial movement imparted thereto by the reaction forces on the worm rotated thereby, said device comprising a drive element, means for driving said drive element, a driven element connected to rotate with the manually rotatable shaft, a clutch adapted to connect the drive element to the driven element, said clutch having an axially movable pressure element for engaging the clutch, means actuated by the said axial movement of the shaft for moving said axially movable pressure element to engage said clutch, and means also actuated by the said axial movement of the shaft for rendering the driving means effective to drive the shaft.

2. A worm drive including a manually rotatable shaft and a worm secured thereto and rotated thereby, and an auxiliary power applying device for the said shaft, said shaft having limited axial movement imparted thereto by the reaction forces on the worm rotated thereby, said device comprising a drive element, means for driving said drive element, a pair of driven elements, a pair of clutches, means connecting the drive element to the driven elements for rotating the driven elements in opposite directions, each of said clutches having an axially movable pressure element for engaging its respective clutch and being adapted to connect a driven element to the rotatable shaft, means actuated by the said axial movement of the shaft for moving said axially movable pressure elements to engage one of said clutches and disengage the other of said clutches, and means actuated by axial movement of the shaft for rendering the driving means effective to drive said drive element.

3. A worm drive including a manually rotatable shaft and a worm secured thereto and rotated thereby, and an auxiliary power applying device for the said shaft, said shaft having limited axial movement imparted thereto by the reaction forces on the worm rotated thereby, said device comprising a drive element, means for driving said drive element, a pair of driven gears, a pair of clutches driven by said gears, gearing connecting one of the driven gears to the drive element for rotation in one direction and connecting the other driven gear to the drive element for rotation in an opposite direction, each of said clutches being adapted to connect a driven gear to the rotatable shaft, said clutches each having an axially movable pressure element for engaging its respective clutch, means actuated by the said axial movement of the shaft for moving the pressure elements of said clutches for engaging one of said clutches and disengaging the other of said clutches, and means actuated by axial movement of the shaft for rendering the driving means effective to drive said drive element.

4. A worm drive including a manually rotatable shaft and a worm secured thereto and rotated thereby, and an auxiliary power applying device for the said shaft, said shaft having limited axial movement imparted thereto by the reaction forces on the worm rotated thereby in either direction of rotation of the shaft, said device comprising a drive element, means for driving said drive element, a pair of driven elements, a pair of clutches, each having an axially movable pressure element for effecting engagement of its clutch, means connecting the drive element to the driven elements for rotating the driven elements in opposite directions, each of said clutches being adapted to connect a driven element to the rotatable shaft, means actuated by the said axial movement of the shaft for moving the axially movable pressure element of one of said clutches for engaging said one of said clutches and disengaging the other of said clutches, electromagnetic means for controlling the operation of the means for driving said drive element, and switch means actuated by axial movement of the shaft in either direction for rendering the electromagnetic means effective.

5. A worm drive including a manually rotatable shaft and a worm secured thereto and rotated thereby, and an auxiliary power applying device for the said shaft, said shaft having limited axial movement imparted thereto by the reaction forces on the worm rotated thereby, said device comprising a drive element, means for driving said drive element, a pair of driven elements, a pair of clutches, each having an axially movable pressure element for engaging its respective clutch, means connecting the drive element to the driven elements for rotating the driven elements in opposite directions, each of said clutches being adapted to connect a driven element to the rotatable shaft, means actuated by the final portion of said axial movement of the shaft for moving the axially movable pressure elements for engaging one of said clutches and disengaging the other of said clutches, and means actuated by the initial portion of the axial movement of the shaft for rendering the driving means effective to drive the said drive element.

6. A worm drive as described in claim 1, said device comprising further a housing through which said rotatable shaft passes, an axially stationary abutment within the housing, said abutment having a central opening through which said shaft passes, a pair of spaced abutments extending radially into said opening, resilient means compressed between said abutments, said driven element being disposed on one side of said resilient means, and means for transmitting axial thrust from said driven element to one end of said resilient means.

7. A worm drive as described in claim 6, said axially stationary abutment comprising a plate secured to the housing and having a central sleeve spaced from the shaft whereby to form the opening through which the shaft passes as aforesaid.

8. A worm drive as described in claim 6, said abutment comprising a plate fixed to the housing and having a central sleeve formed integrally therewith, and said drive element being mounted on said sleeve for free rotation relative thereto.

9. A worm drive as described in claim 6, said driven element connected to rotate with the manually rotatable shaft comprising a hub member having external splines and an external thread, said means actuated by the said axial movement of the shaft for moving said axially movable pressure element comprising a nut threaded on said external thread and adapted to limit the position of the pressure member axially of the hub member, and resilient anti-rattle means connecting the pressure member to the nut, said anti-rattle means and said nut having interengageable elements for preventing relative rotation therebetween.

10. A worm drive including a manually rotatable shaft and a worm secured thereto and rotated thereby and an auxiliary power applying device for the said shaft, said shaft having limited axial movement imparted thereto by the reaction forces on the worm rotated thereby, said device comprising a drive element, means for driving said drive element, a torque release device connecting the driving means to said drive element and adapted to release the drive therebetween when the torque load on said drive element exceeds a predetermined value, a driven element connected to rotate with the manually rotatable shaft, a clutch adapted to connect the driving element to the driven element, means actuated by the said axial movement of the shaft for engaging said clutch, and means also actuated by the said axial movement of the shaft for rendering the driving means effective to drive the shaft.

11. The combination as described in claim 10, said torque release means including means for making an audible signal to indicate the existence of an excessive torque load in the driven element.

12. A worm drive including a manually rotatable shaft and a worm secured thereto and rotated thereby and an auxiliary power applying device for the said shaft, said shaft having limited axial movement imparted thereto by the reaction forces on the worm rotated thereby, said device comprising a drive element, power driven pulley means, a shaft connected to the drive element, clutch means for connecting the pulley to the last-mentioned shaft for rotation therewith, pressure differential means for engaging the clutch means, a valve controlling the creation of a pressure differential in said pressure differential means, a solenoid controlling the operation of the valve, a driven element connected to rotate with the manually rotatable shaft, a second clutch adapted to connect the driving element to the driven element, means actuated by the said axial movement of the manually rotatable shaft for engaging the second clutch, and switch means also actuated by the said axial movement of the shaft, for controlling the energization of said solenoid, whereby axial movement of the manually rotatable shaft actuates the switch means to energize the solenoid and operate the valve to create the pressure differential in the pressure differential operated means.

References Cited in the file of this patent

UNITED STATES PATENTS

| | | |
|---|---|---|
| Re. 23,673 | Penrose | June 30, 1953 |
| 2,021,706 | Twyman | Nov. 19, 1935 |
| 2,553,795 | Staude | May 22, 1951 |
| 2,667,232 | Woolley | Jan. 26, 1954 |
| 2,678,485 | Browne | May 18, 1954 |
| 2,691,308 | Lincoln | Oct. 12, 1954 |
| 2,695,696 | Tavelli | Nov. 30, 1954 |
| 2,754,465 | Brier | July 10, 1956 |
| 2,825,236 | Nabstedt et al. | Mar. 4, 1958 |
| 2,833,154 | Barnes et al. | May 6, 1958 |
| 2,841,023 | Gorshboff | July 1, 1958 |